Sept. 17, 1940.  R. J. JENSEN  2,215,242
AUTOMATIC CONTROL FOR ELECTRIC MOTORS
Filed June 24, 1937  2 Sheets-Sheet 1
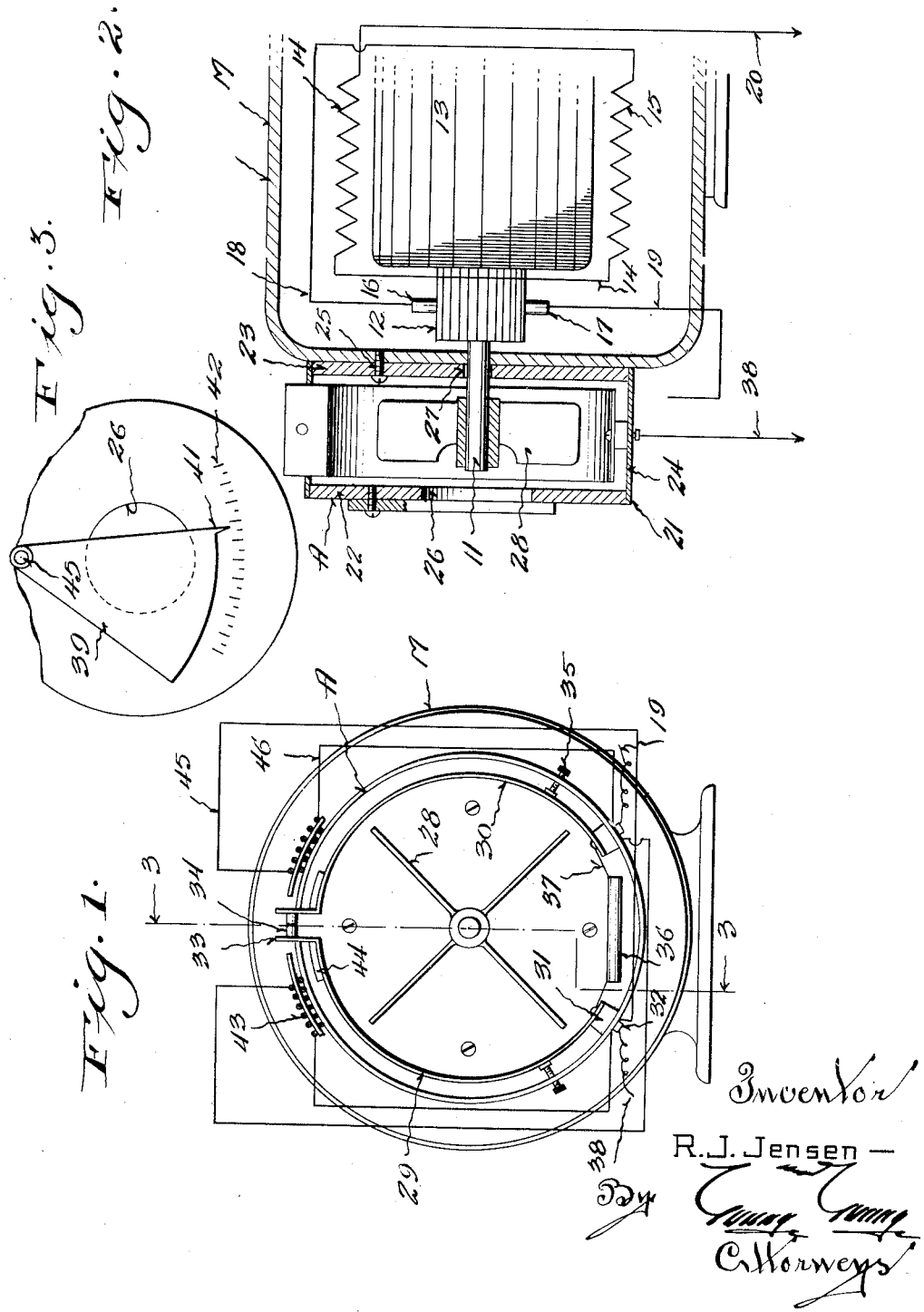

Sept. 17, 1940.  R. J. JENSEN  2,215,242
AUTOMATIC CONTROL FOR ELECTRIC MOTORS
Filed June 24, 1937  2 Sheets-Sheet 2
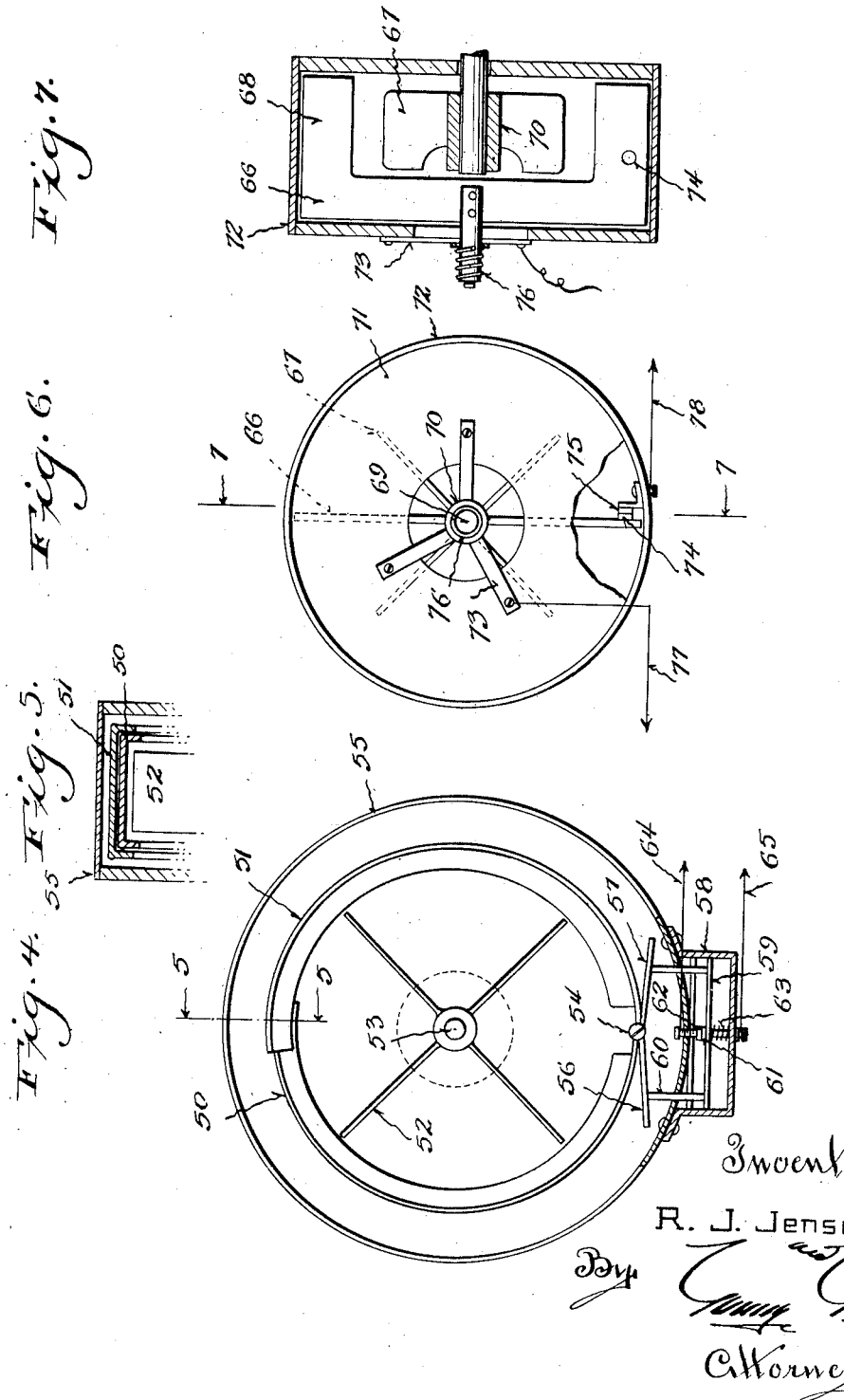

Patented Sept. 17, 1940

2,215,242

UNITED STATES PATENT OFFICE 2,215,242

AUTOMATIC CONTROL FOR ELECTRIC MOTORS

Raymond John Jensen, Milwaukee, Wis., assignor to Electric Motor Control Co., Milwaukee, Wis.

Application June 24, 1937, Serial No. 150,091

1 Claim. (Cl. 200—81)

This invention appertains to automatic controls for electric motors, and more particularly to a novel circuit-breaker for regulating the speed and efficiency of an electric motor.

One of the primary objects of my invention is to provide an automatic circuit-breaker device controlled by air pressure or suction acting upon a sensitive part of the device, so that when the pressure or suction, as the case may be, reaches a predetermined value, said part will be actuated thereby to cause the opening of the contacts of the device.

Another salient object of my invention is to provide an automatic circuit-breaker for electric motors for controlling the speed and efficiency thereof, embodying a fan driven from the motor for setting up air current, with means for directing said air current against a spring-urged part of the appliance, so that when the air pressure overcomes the tension of the spring-urged part, the same will be actuated to cause the opening of normally closed contacts.

A further object of my invention is to provide an attachment for electric motors which can be quickly and easily attached to the motor without any change thereto, and which will automatically open the circuit to the motor when the same exceeds a predetermined speed.

A further important object of my invention is to provide means for utilizing a part of the air current set up for cooling the contacts.

A further object of my invention is to provide means whereby the automatic circuit-breaker can be utilized on heavy duty motors, means being provided for quenching the spark at the contacts incident to the automatic opening and closing thereof.

A still further object of my invention is to provide an automatic control for motors of the above character, which will be durable and efficient in use, one that will be simple and easy to manufacture, and one which can be placed upon the market and incorporated with a motor at a small cost.

With these and other objects in view, the invention consists in the novel construction, arrangement, and formation of parts, as will be hereinafter more specifically described, claimed, and illustrated in the accompanying drawings, in which drawings:

Figure 1 is a front elevation of one form of my improved circuit-breaker, showing the same applied to an electric motor, the front wall of the shell of the device being shown removed so as to disclose to view the interior parts of the device.

Figure 2 is a central sectional view through the improved appliance, showing the same applied to an electric motor, only a portion of the motor being shown, and such portion being of a diagrammatic nature.

Figure 3 is a fragmentary front elevation of the circuit-breaker, showing one form of means for controlling the volume of air passing therethrough.

Figure 4 is a front elevation of a modified form of my improved motor control, with parts thereof broken away and in section.

Figure 5 is a detail fragmentary section taken substantially on the line 5—5 of Figure 4, looking in the direction of the arrows.

Figure 6 is a view similar to Figure 4, showing a still further form of my invention.

Figure 7 is a section through the modified form of the invention taken substantially on the line 7—7 of Figure 6, looking in the direction of the arrows.

Referring to the drawings in detail, wherein similar reference characters designate corresponding parts throughout the several views, the letter A generally indicates one form of my improved appliance, and M an electric motor with which the same can be associated.

The motor M can be considered as of any preferred character or make and has been merely illustrated to show the use of my appliance.

As shown, the motor M includes a casing or shell 10 having extended through one end wall or bell thereof the armature shaft 11. The motor includes a commutator 12 carried by the shaft and the armature 13. Field coils 14 and 15 are provided. Brushes 16 and 17 engage the commutator, and these brushes have leading therefrom wires 18 and 19 in the ordinary manner.

The wire 18 is connected to one field coil 15, and this coil is in turn connected by means of a wire 19 with the other field coil 14. This coil, in turn, has connected thereto one of the line wires 20. The wire 19 usually extends to the other line wire, but in the present instance the same is connected with a part of the appliance A, as will be later set forth.

My appliance A includes a housing 21 having front and rear discs 22 and 23, which are connected by an annular side wall 24. These parts are preferably formed from insulating material, and the inner wall or disc 23 can be attached to the motor casing 10 by means of suitable fastening elements 25. The outer wall or disc 22 can be connected to the outer wall 24 by the use of suitable removable fastening elements, and this disc or front wall 22 is provided with an enlarged central air intake opening 26. The armature shaft 11 extends through a central opening 27 formed in the inner disc or wall 23. A centrifugal fan 28 is secured to the armature shaft 11, and the same is housed within the housing 21 and serves to take air into the housing through the opening 26. This fan can also be utilized for cooling the motor, if so desired.

Arranged within the housing 21 is a pair of arcuate resilient blades 29 and 30, which function in the nature of diaphragms, which will also be more fully set forth. The inner ends of these arms 29 and 30 are rigidly secured to blocks 31 by means of pins 32, which form binding posts.

As illustrated, the arms curve about the blades of the fan 28 and terminate in outwardly extending lips 33 carrying contacts 34. The inherent resiliency of the arms 29 and 30 normally holds the contacts in engagement with one another. Set screws 35 can be carried by the outer wall 24 of the housing for engaging the arms 29 and 30 to limit the swinging movement thereof, and these set screws can be initially set by the operator.

The inner ends of the arms or blades 29 and 30 are connected to a condenser 36 by means of wires 37, and the binding posts or bolts 32 have connected respectively therewith the wire 19 and the line wire 38. As heretofore stated, the wire 19 leads from the brush 17 of the motor, and the wire 38 constitutes the line wire from a suitable source of electrical energy.

The current flow, when the contacts 34 are in engagement, is as follows: through the wire 38, arm 29, contacts 34, arm 30, wire 19, through the brushes 17 and 16, through wire 18, through the field coils 14 and 15, through wire 20, to the source of electrical current.

In operation of my improved device, it can be seen that when the circuit is closed through the motor, the fan 28 will be rotated with the armature shaft, and this fan will take in air through the opening 26, and constantly impinge the air against the blades or arms 29 and 30. The inherent resiliency of the arms tends to resist the air flowing against the same, and thus under normal working conditions, the resiliency of the arms will hold the contacts 34 closed.

However, as soon as the pressure of the air overcomes the resiliency of the arms or blades 29 and 30, the arms will be spread and the contacts 34 separated. Thus, the current will be immediately broken through the motor. As soon as the motor falls below a predetermined speed, the resiliency of the blades 29 and 30 will immediately move the contacts into engagement. Thus, by this arrangement, the speed of the motor can be maintained substantially constant.

The strength of the arms or blades 29 and 30 can be set to regulate their resistance to the air, but means can also be provided for manually regulating the volume of air handled by the fan, so that the device can be set to stop the motor when the same reaches different speeds.

Thus, the active size of the opening 26 can be controlled through any mechanism for regulating the amount of air flowing through the opening. As stated above, any mechanism can be utilized for regulating the size of the opening, and, as shown, I have provided a shutter 39 pivotally mounted, as at 40, to the front disc 22 of the housing 21. This shutter can be swung over and away from the opening 26, and means can be provided for latching the shutter in any adjusted position. In the drawings, friction is utilized between the shutter and the front disc 22 to hold the same in an adjusted position.

The shutter can carry a tooth 41, which is adapted to move over a calibration or scale 42 formed on or secured to the disc 22. The scale can carry suitable numbers for indicating the position of the shutter for stopping the motor at the desired speed.

It has been found that in some very low speed motors difficulty is encountered in opening the contacts 34 by the air pressure set up by the fan 28. To assist the opening of the arms or blades, I can provide electromagnets 43 carried by the housing 21. The arms or blades 29 and 30 can carry armatures 44, and the electromagnets will tend to attract the magnets and thus assist in spreading the arms or blades and separating the contacts. The opposite ends of the electromagnets carry electric wires 45 and 46 respectively, and these wires are in turn connected respectively to the binding post 32, and the electromagnets are thus excited from the line wires 20 and 38.

With my device, not only can the speed of the electric motor be conveniently controlled, but the same functions to even out the line load change, which tends to make the performance of a motor uneven. Thus, the motors will operate at a steady unaffected speed when under load changes.

While I have illustrated the shutter 39 at the intake, it is to be understood that a control means could be provided at the outlet for the air and thus regulate the volume of air handled by the fan.

My device can be effectively used on high amperage motors by providing a cooling liquid receptacle or spark quencher for the contacts. In Figure 4 I have shown a control for a high speed motor.

In this form I provide substantially semicircular blades or diaphragms 50 and 51. These blades extend about a fan 52 secured on the armature shaft 53 of the motor. These blades or arms are formed from relatively thin material and are of a substantially U-shape in cross-section and have their upper ends arranged in overlapping relation. The lower ends of the blades are pivotally mounted on a pivot pin 54, which can be carried by the housing 55 of my appliance. The blades have their lower ends beyond the pivot 54 bent back to provide arms 56 and 57. These arms extend above a suitable casing 58, which can be filled with oil or other desirable liquid.

Arranged within the container 58 is a movable plate 59 carrying pins 60, which slidably extend through the container into the housing 55, and the arms 56 and 57 normally rest upon the upper surface of the pins. The central portion of the plate 59 carries a contact 61, and this contact is normally held in engagement with a contact 62 carried by the container by means of an expansion spring 63. This expansion spring 63 is confined between the bottom wall of the container 58 and the plate 59. The spring 63 not only functions to hold the contact 61 in engagement with the contact 62, but also functions to hold the arms 56 and 57 in a raised position, with the blades 50 and 51 resisting air pressure set up by the fan 52. Wires 64 and 65 are electrically connected with the contacts 62 and 61, and these wires correspond to the wires 19 and 38 of that form of my invention shown in Figures 1, 2, and 3.

In operation, when the air pressure set up by the fan overcomes the tension of the spring 63, the blades 50 and 51 will be spread apart, and the arms 56 and 57 will be forced downwardly. This will move the plate 59 downward and the contacts 61 will be moved away from the contacts 62, and consequently the current to the motor will be broken.

By having the contacts 61 and 62 immersed in oil, the contacts will be cooled and the oil will tend to extinguish the arc that is a result of high amperage. This prevents the oxydization of the contacts and the shortening of the arc or spark gap.

I can utilize different forms of blades, and in Figures 6 and 7 I have illustrated another form of my invention in which I utilize a diametrically extending vane or blade 66. This vane or blade 66 extends across the fan 67 and has formed on its outer ends arms 68, which extend over the blades of the fan. The axial center of the blade has secured thereto a shaft 69, and this shaft is rotatably mounted in a suitable bearing 70. The bearing 70 can be connected with the front wall 71 of the housing 72 by means of arms 73. One end of the blade carries a contact 74, which is adapted to normally engage a stationary contact 75 carried by the side wall of the housing. A coil spring 76 can be wound about the shaft 69, and one end of this spring can be connected to the bearing, and the other end of the spring can be connected to the shaft. The tension of this spring is such that the same tends to rotate the blade 66 and hold the contact 74 in engagement with the contact 75.

The pressure of the air set up by the fan 67 impinges against the blade in a direction opposite to the tension of the spring, and consequently when the pressure of the air exceeds the tension of the spring, the blade will be rotated against said spring to move the contact 74 away from the contact 75 to open a circuit. Wires 77 and 78 are electrically connected to the contacts, and these wires correspond to the wires 19 and 38 in Figures 1, 2, and 3.

From the foregoing description it can be seen that I have provided an exceptionally simple and durable means for controlling the speed of a motor and generally increasing the efficiency thereof.

Changes in details may be made without departing from the spirit or the scope of my invention, but what I claim as new is:

In a speed control device for electric motors, a fan housing, a motor-driven fan in said housing, movable arcuate blades in said housing surrounding the fan, whereby the air from the fan will impinge against said blades, contacts carried by the blades, spring means normally urging the blades toward one another with the contacts in engagement, and said blades being adapted to be moved apart by the air from the fan when the air pressure exceeds a predetermined value.

RAYMOND JOHN JENSEN.